No. 786,259. PATENTED APR. 4, 1905.
A. BOURNIQUE.
MACHINE FOR THE MANUFACTURE OF PLATE GLASS AND CYLINDERS.
APPLICATION FILED MAY 25, 1904.
5 SHEETS—SHEET 1.
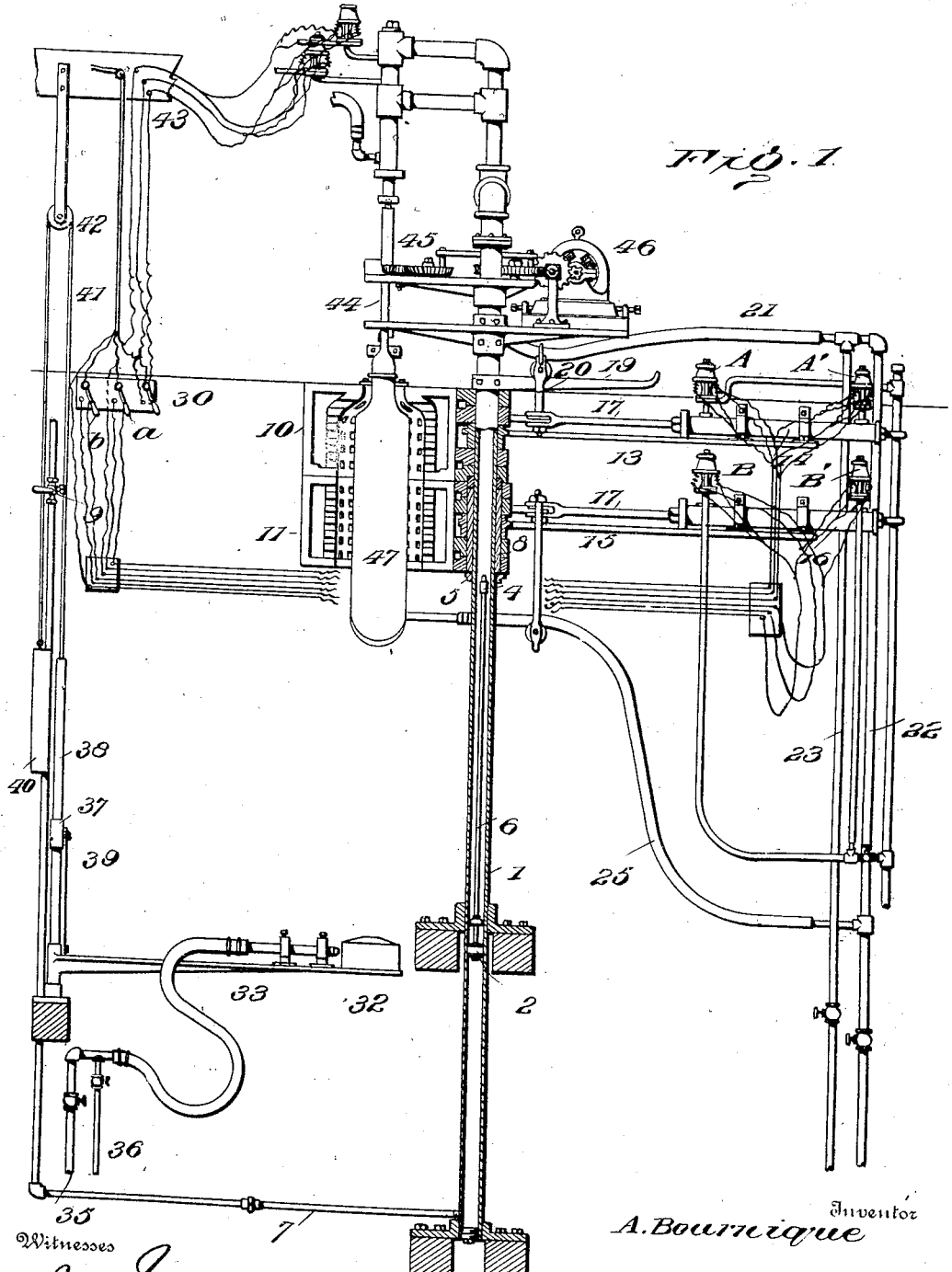
Fig. 1.
Witnesses
H. N. Woodson
Inventor
A. Bournique
By
Attorneys No. 786,259. PATENTED APR. 4, 1905.
A. BOURNIQUE.
MACHINE FOR THE MANUFACTURE OF PLATE GLASS AND CYLINDERS.
APPLICATION FILED MAY 25, 1904.

5 SHEETS—SHEET 4.

Witnesses
Inventor
A. Bournique
By
Attorneys

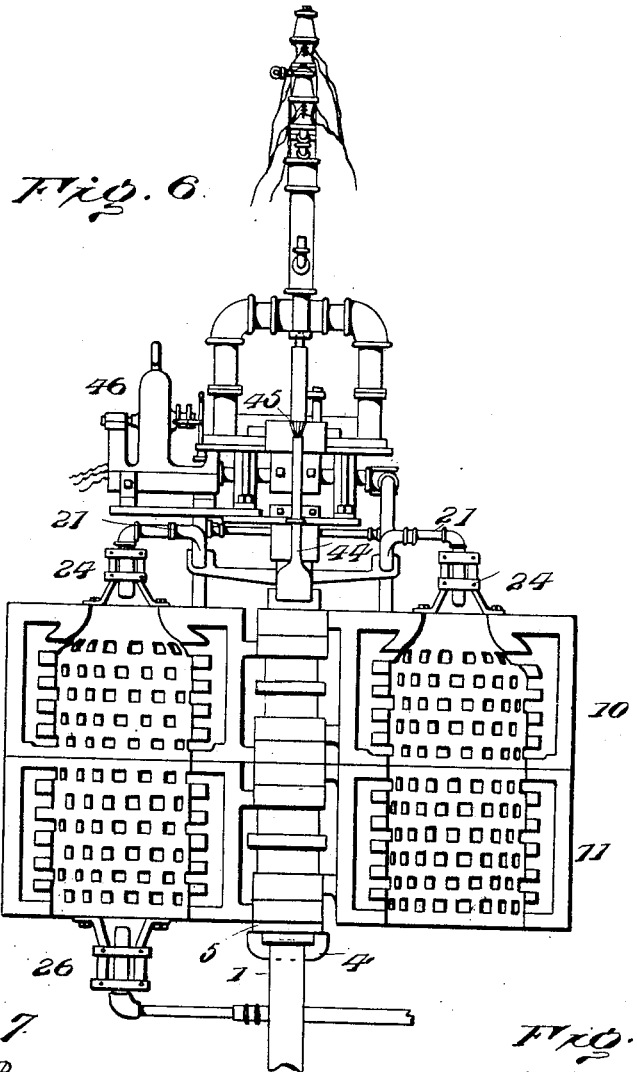

No. 786,259.

Patented April 4, 1905.

UNITED STATES PATENT OFFICE.

ADOLPHE BOURNIQUE, OF CHESTERTON, INDIANA.

MACHINE FOR THE MANUFACTURE OF PLATE-GLASS AND CYLINDERS.

SPECIFICATION forming part of Letters Patent No. 786,259, dated April 4, 1905.

Application filed May 25, 1904. Serial No. 209,771.

*To all whom it may concern:*

Be it known that I, ADOLPHE BOURNIQUE, a citizen of France, residing at Chesterton, in the county of Porter and State of Indiana, have invented certain new and useful Improvements in Machines for the Manufacture of Plate-Glass and Cylinders, of which the following is a specification.

This invention is chiefly designed as an improvement on the apparatus for which I filed an application for patent November 16, 1903, Serial No. 181,430, the purpose being to materially simplify the construction and to dispense with the reheater and cooler, thereby economizing in space and machinery and dispensing with the step in the operation requiring the transference of the blowpipe and attached glass from the primary to the second expanding mechanism for working the glass in the further process of expansion and elongation of the bulb.

The present invention contemplates a series of heaters or furnaces mounted for relative vertical adjustment for adaptation to the elongation of the bulb in the expanding operation, so that any portion thereof, usually the lower end, may be reheated without softening other parts, as the upper end of the bulb.

The invention further provides a counterbalanced burner for centrally softening the lower end of the bulb preliminary to opening the same for forming the cylinder after the bulb has otherwise attained the required dimensions.

The invention also embodies novel and peculiar operating means whereby the several parts may be mechanically controlled from a given point by the manipulation of switch-levers and valves, all as will more fully appear hereinafter.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 2:
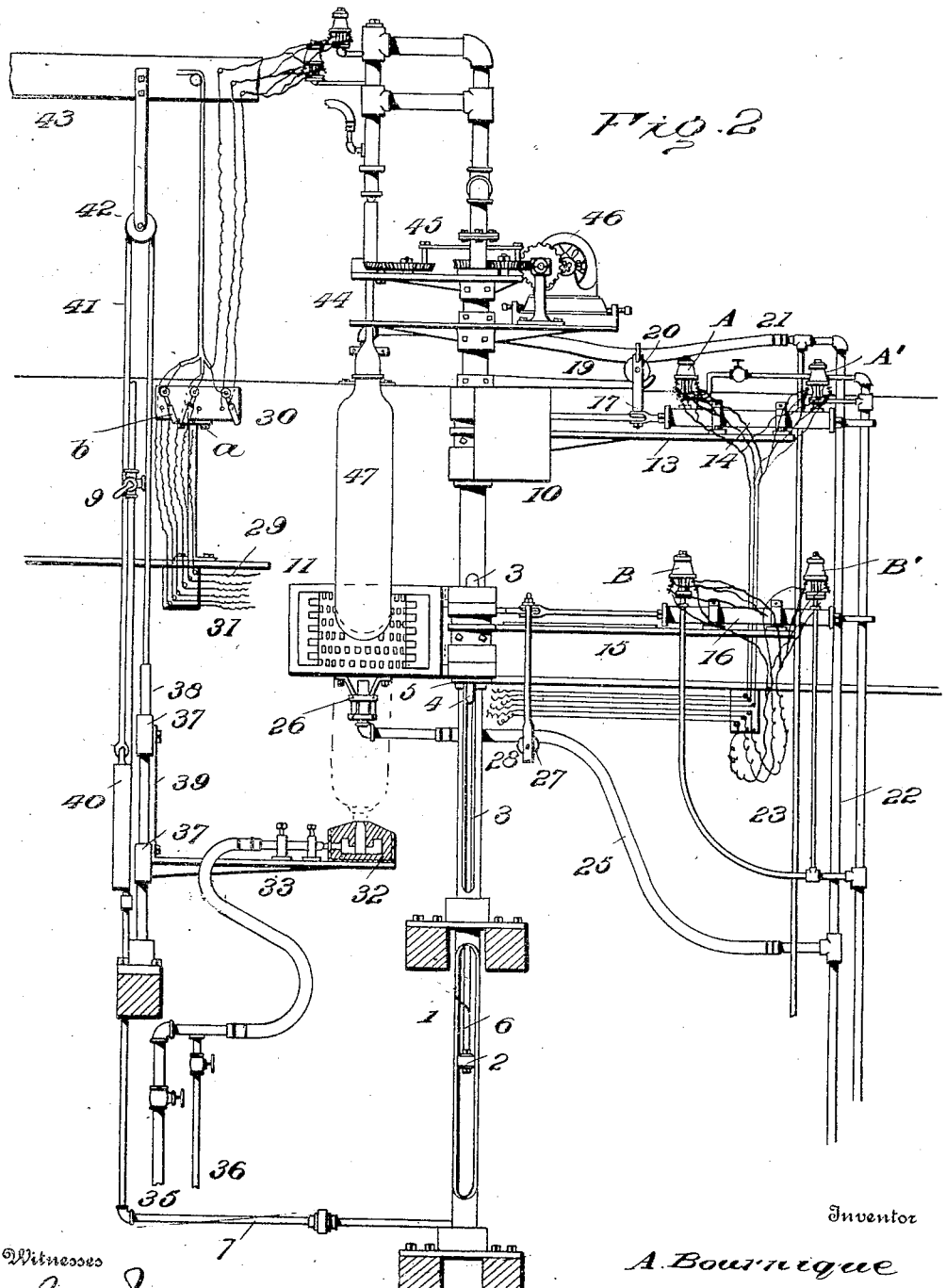
Figure 3:
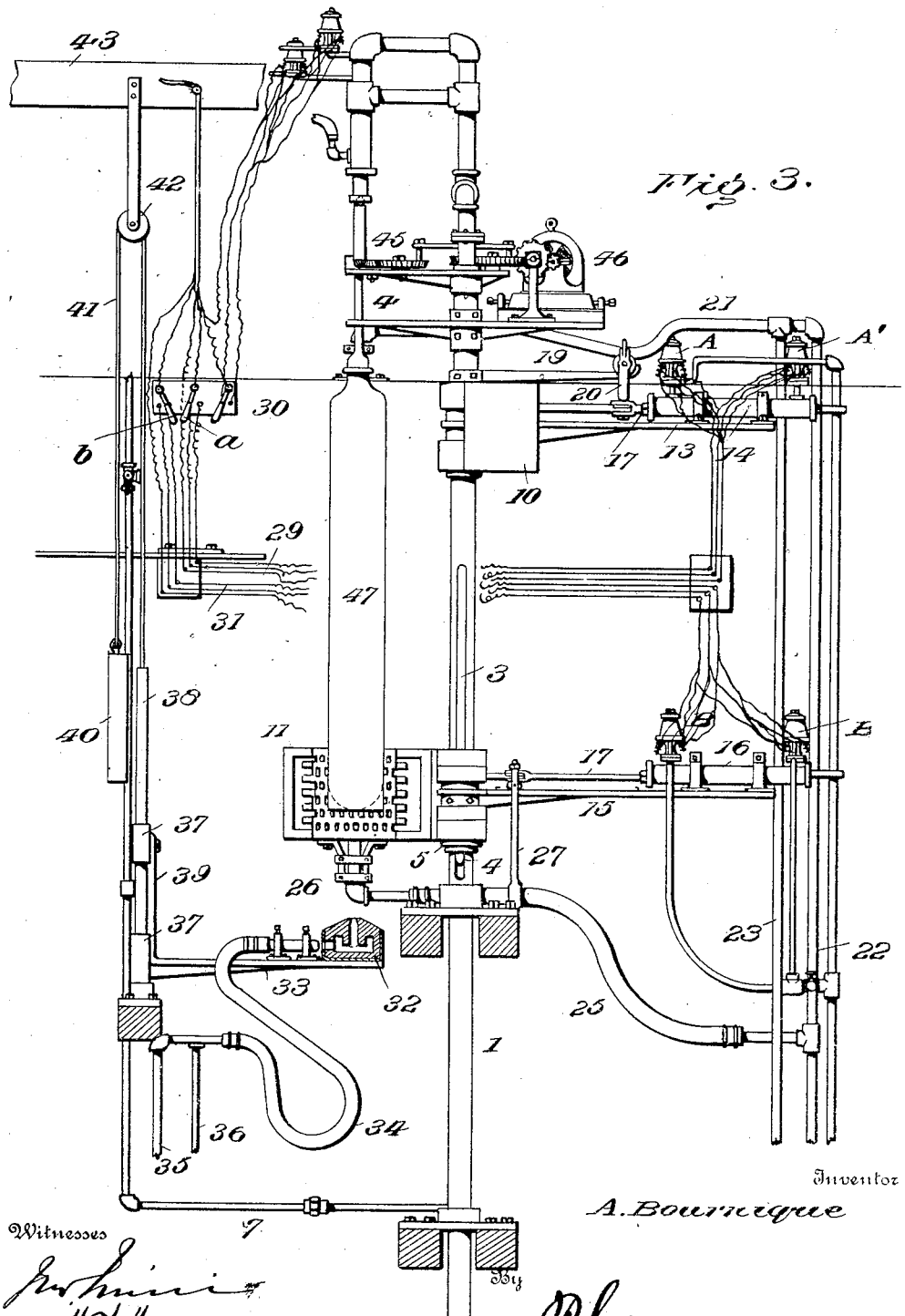
Figure 4:
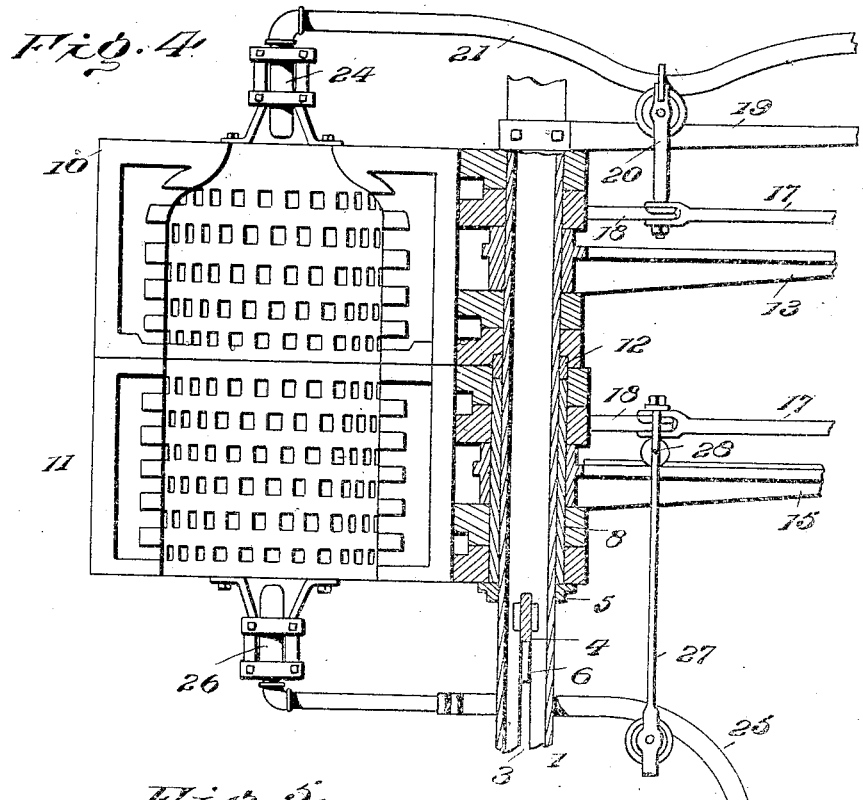
Figure 5:
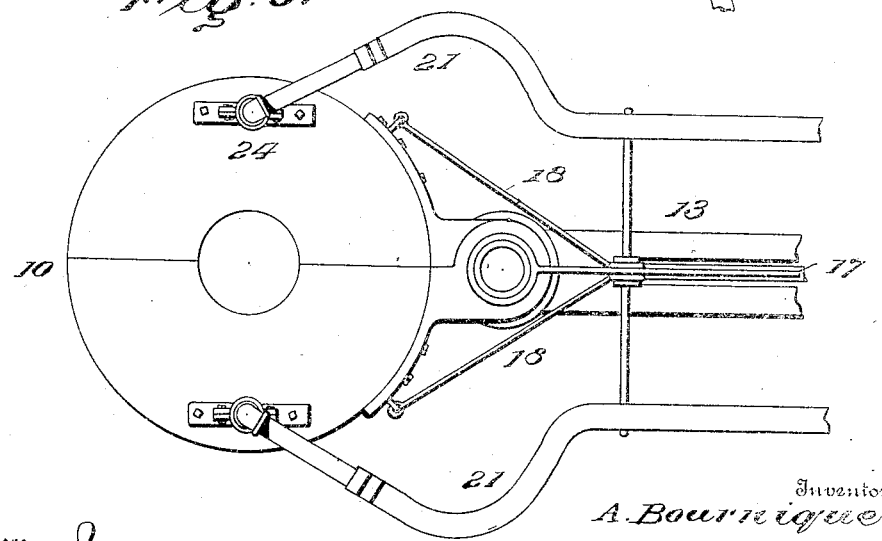

Figure 1 is a view in elevation of an apparatus for working glass in accordance with this invention, the heaters or furnaces, their hinge-mountings, and the lower portion of the column supporting the operating parts being in section. Fig. 2 is a side view of a mechanism for working glass embodying the invention, parts being in section, the upper heater or furnace being open or thrown out of the way and the lower heater or furnace being illustrated in position for softening the lower end of the bulb. Fig. 3 is a view of the apparatus similar to Fig. 2, showing the position of the lower heater or furnace and the burner when at their lowest adjustment. Fig. 4 is a detail view of the heaters or furnaces and the mountings therefor, on a larger scale, the inner sections or halves of the furnaces being omitted. Fig. 5 is a top plan view of the parts shown in Fig. 4. Fig. 6 is a front view of the upper portion of the apparatus, on a larger scale, the heaters or furnaces being open. Figs. 7, 8, and 9 are sectional detail views of the three-way valve, showing different positions.

Corresponding and like parts are referred to in the following description and indicated in all the views of the drawings by the same reference characters.

The column for supporting the operating parts is indicated at 1 and is preferably hollow, so as to be utilized as a motor-cylinder, in which a piston 2 is arranged to operate. The lower portion of the column 1 only serves as the motor-cylinder and may be an integral part of the column or coupled thereto in any substantial manner. Slots 3 are formed in opposite sides of the middle portion of the column 1, and the end portions of cross-head 4 project through said slots beyond opposite sides of the column and support a collar 5, which may be connected thereto in any way. The cross-head 4 is attached to the piston-rod 6, so as to move therewith. A pipe 7 connects with the lower end of the column or motor-cylinder and communicates with a source of supply of compressed air or other fluid medium. A sleeve 8 encircles the column 1 and rests upon the collar 5 and is movable with the latter. A three-way valve 9 is interposed in the length of the pipe 7 and controls the admission of the motive or fluid medium into the motor-cylinder at the lower end of the column 1. When the valve is turned to the position substantially as shown in Fig. 7, the motive medium is admitted into said motor-cylinder and forces the piston 2 upward therein. When the valve is turned to the position substantially as shown in Fig. 8, the supply of motive medium is cut off from the motor-cylinder and the piston 2 is held at the required adjusted position. Upon turning the valve in the position approximately as shown in Fig. 9 the fluid medium is permitted to escape from the motor-cylinder, thereby allowing the piston 2 and parts supported thereby to descend. It will thus be understood that by proper manipulation of the three-way valve the piston 2 may be elevated or lowered or held at any point within its range of movement.

The means for heating the bulb of glass during the expanding and elongating process embody a plurality of furnaces, the same being indicated at 10 and 11. These heaters or furnaces are of duplicate construction, each consisting of complemental sections hinged in coaxial alinement with the column 1. The uppermost heater or furnace 10 is hinged directly upon the column 1 and is held from vertical movement, being supported upon the column by means of a collar 12, secured to said column. The lower heater is hinged upon the sleeve 8 and is movable vertically therewith. An arm 13 is secured to the column at a point between the upper and lower hinges of the heater 10 and supports a motor-cylinder 14. A corresponding arm 15 is secured to the sleeve 8 at a point between the upper and lower hinges of the heater 11 and supports a motor-cylinder 16. The outer ends of the piston-rods 17 of the respective motor-cylinders 14 and 16 are secured by links 18 to the sections of the respective heaters or furnaces 10 and 11. An arm 19 supports a trolley 20, which carries the weight of the upper piston-rod 17 and links 18 at their point of connection. The arm 19 is secured directly to the column 1. A flexible tube 21 conveys air or gas from the respective pipes 22 and 23 to the burner 24 of the upper heater or furnace 10. This flexible tube is supported at a point between its ends by means of the trolley 20. A flexible tube 25 connects the pipes 22 and 23 with the burner 26 of the lower heater or furnace 11 and is supported by means of a hanger 27, forming a part of the trolley 28, mounted to travel upon the arm 15 and supporting the piston-rods 17 and links 18 of the lower motor-cylinder and furnace at their point of pivotal connection.

Valves A A' are applied to opposite ends of the motor-cylinder 14 and control the admission of the motive medium thereto and the exhausting of said motive medium when spent. These valves A A' may be of any construction so long as they serve to regulate the inflow and the outflow of the motive medium. By preference the valves A A' are of the type to be controlled electrically and are connected, by means of electric wires 29, to a switch-lever $a$ of a switchboard 30, the electric wires and switch connections being of any approved construction to admit of proper control of the valves A A', so as to effect the desired result. Valves B B' are connected to the motor-cylinder 16 for coöperation therewith in a manner similar to the valves A A' and are connected, by means of electric wires 31, to the switch-lever $b$ of the switchboard 30. By manipulating the switch-lever $a$ the sections of the heater or furnace 10 may be opened or closed, and by operating the switch-lever $b$ the sections of the heater or furnace 11 may likewise be opened or closed.

A burner 32, attached to an arm 33, is connected, by means of a rubber tube 34, with air and gas pipes 35 and 36. The arm 33 is connected by slides 37, mounted upon a vertical guide 38, said slides 37 consisting of sleeves connected by means of a plate 39. A weight 40, attached to one end of a rope or cable 41, serves as a counterbalance for the burner 32 and attached parts. The rope or cable 41 passes over a sheave-pulley 42, suspended from a beam or other overhead support 43, and is connected at one end to the burner-supporting means and at its opposite end to the weight 40. By mounting the burner 32 in the manner stated it may be raised or lowered and is held in the adjusted position by means of the counterbalance, as will be readily comprehended.

The blowpipe is indicated at 44 and is connected by a train of gearing 45 to a motor 46, so as to receive a reverse rotary movement. The motor 46 and connections 45 may be of any construction and arrangement so long as they serve to impart rotation to the blowpipe 44 in opposite directions.

In accordance with this invention a quantity of glass is taken up by means of the blowpipe 44, after which the blowpipe is rotated alternately in opposite directions, and at the same time air is forced through the blowpipe to expand the glass, so to as form the bulb 47. Simultaneously with the expansion of the bulb the latter is elongated by gravitative action. When it is required to heat the bulb, the valve 9 is moved so as to admit motive medium into the motor-cylinder below the piston 2, thereby lifting the heater or furnace 11 into a position adjacent to the heater or furnace 10. By turning the valve 9 into the position shown in Fig. 8 the heater 11 is held elevated. The furnaces 10 and 11 are closed around the bulb 47 by operating the switch-levers *a* and *b*, so as to admit compressed air or other fluid medium into the respective motor-cylinders 14 and 16, so as to drive their pistons forward. After the bulb has been sufficiently softened a reverse movement of the switch-levers *a* and *b* opens the heaters or furnaces 10 and 11, and the air previously shut off from the blowpipe is again turned on, so as to further expand the bulb 47.

When in the expanding of the bulb 47 it becomes necessary to reheat the lower end thereof, the heater or furnace 11 is moved on the column 1 to a position corresponding with the lower end of the bulb, as indicated in Fig. 2, the sections of the heater being closed about the lower end of the bulb by operating the switch-lever *b*. After the lower portion of the bulb is softened the heater 11 is opened or dropped, so as to be out of the way, and the expanding of the bulb is continued by forcing air therein through the blowpipe. After the bulb 47 has been expanded to the required dimensions the burner 32 is moved into position, so as to direct the flame against the lower end of the bulb, which is softened and begins to bulge and finally burst or open by reason of the pressure of air within. After the lower end of the bulb is opened the burner 32 is moved aside and the heater or furnace 11 brought into the position substantially as indicated in Fig. 3 to soften the lower end portion of the bulb to admit of its opening full. The cylinder thus formed is removed from the apparatus, together with the blowpipe, and is cracked from the latter and subsequently split longitudinally and flattened in the accustomed manner, thereby forming the glass plate.

Having thus described the invention, what is claimed as new is—

1. In apparatus for the manufacture of glass, the combination of a series of alined heaters or furnaces, each composed of movable sections, means for opening and closing the sections of the respective heaters, and other means for relatively moving the heaters, substantially as set forth.

2. In apparatus of the character described, the combination of a vertical support, an upper heater or furnace mounted on said support, a lower heater or furnace slidable upon said support, and means for vertically adjusting the lower heater and holding the same in the required position, substantially as described.

3. In apparatus of the character described, the combination of a vertical support, a heater or furnace mounted thereon, a second heater or furnace vertically movable upon said support, a motor-cylinder in axial alinement with said vertical support and connected with the lower heater to effect vertical movement thereof, and means for supplying motive medium to said motor-cylinder to effect adjustment of the lower heater and to hold the same in the required position, substantially as specified.

4. In combination, a hollow column having its lower portion constituting a motor-cylinder and having a longitudinal slot in a side, a piston movable in the motor-cylinder, a cross-head connected with the piston-rod and operating in said column and having a portion extended through the slot in the side thereof, a heater slidable upon the column, and means connecting said heater with the cross-head to cause simultaneous movement thereof, substantially as set forth.

5. In combination, a hollow column having a motor-cylinder at its lower end, a sectional heater secured to said column, a sleeve slidable upon the column and controlled in its vertical movements by the aforesaid motor-cylinder, and a second heater composed of sections hinged upon the said sleeve, substantially as set forth.

6. In combination, a hollow column having a motor-cylinder at its lower end, a heater composed of sections hinged upon said column, a sleeve slidable upon the column and controlled in its vertical movements by means of said motor-cylinder, a second heater composed of sections hinged upon said sleeve, independent motor-cylinders connected with the sections of the respective heaters for opening and closing the same, and means for controlling the supply of motive medium to the motor-cylinder at the lower end of the hollow column to move the lower heater to the required elevation and hold the same in the adjusted position, substantially as set forth.

In testimony whereof I affix my signature in presence of two witnesses.

ADOLPHE BOURNIQUE. [L. S.]

Witnesses:
  ISAAC WRIGHT,
  LORA C. HOSS.